United States Patent [19]

Fuerle

[11] 4,370,649
[45] Jan. 25, 1983

[54] PAYMENT RESPONSIVE DATA DISPLAY NETWORK

[76] Inventor: Gerard A. Fuerle, 4434 N. Third St., Philadelphia, Pa. 19140

[21] Appl. No.: 265,063

[22] Filed: May 19, 1981

[51] Int. Cl.³ .............................................. H04Q 9/00
[52] U.S. Cl. .............................. 340/825.35; 235/381; 179/2 DP; 364/408; 340/825.27
[58] Field of Search .................... 179/2 DP, 6.3 R; 364/408, 410, 412; 340/825.26, 825.27, 825.35; 235/381

[56] References Cited

U.S. PATENT DOCUMENTS

| | | | |
|---|---|---|---|
| 3,082,402 | 3/1963 | Scantlin | 340/152 |
| 3,249,919 | 5/1966 | Scantlin | 340/152 |
| 3,281,789 | 10/1966 | Willcox et al. | 340/152 |
| 3,299,418 | 1/1967 | Treseder | 340/324 |
| 3,314,051 | 4/1967 | Willcox et al. | 340/172.5 |
| 3,344,401 | 9/1967 | MacDonald et al. | 340/172.5 |
| 3,500,327 | 3/1970 | Belcher et al. | 340/154 |
| 3,553,378 | 1/1971 | Alter et al. | 179/6 |
| 3,569,935 | 3/1971 | Sieracki et al. | 340/152 |
| 3,609,227 | 9/1971 | Kuijian | 178/6.6 A |
| 3,716,835 | 2/1973 | Weinberg et al. | 340/154 |
| 3,718,906 | 2/1973 | Lightner | 340/147 R |
| 3,774,161 | 11/1973 | Chambers | 340/172.5 |
| 3,821,705 | 6/1974 | Chertok et al. | 340/152 R |
| 3,938,093 | 2/1976 | Riess | 340/152 R |
| 3,961,324 | 6/1976 | Cousin et al. | 340/324 AD |
| 3,974,338 | 8/1976 | Luzier et al. | 340/825.27 |
| 4,119,953 | 10/1978 | Yeschick | 340/324 AD |
| 4,150,254 | 4/1979 | Schussler et al. | 179/2 TV |
| 4,300,040 | 11/1981 | Gould et al. | 340/825.35 |
| 4,321,673 | 3/1982 | Hawwass et al. | 364/412 |

OTHER PUBLICATIONS

"A Remote Gaming System", R. Hedges et al., International Application Publication WO81/01664, Jun. 25, 1981.

*Primary Examiner*—Donald J. Yusko
*Attorney, Agent, or Firm*—Steele, Gould & Fried

[57] ABSTRACT

A payment responsive system for displaying information comprises at least one remote terminal adapted to display information for a pre-determined time upon payment, a central processor adapted to control input of information and transmission to the remote terminal, the tramsmission to be initiated at programmed times by the central processor independently of any occurrence of a display query at the remote terminal. The preset time may optionally be restarted upon occurrence of data transmission from the central processor during a display period.

9 Claims, 7 Drawing Figures

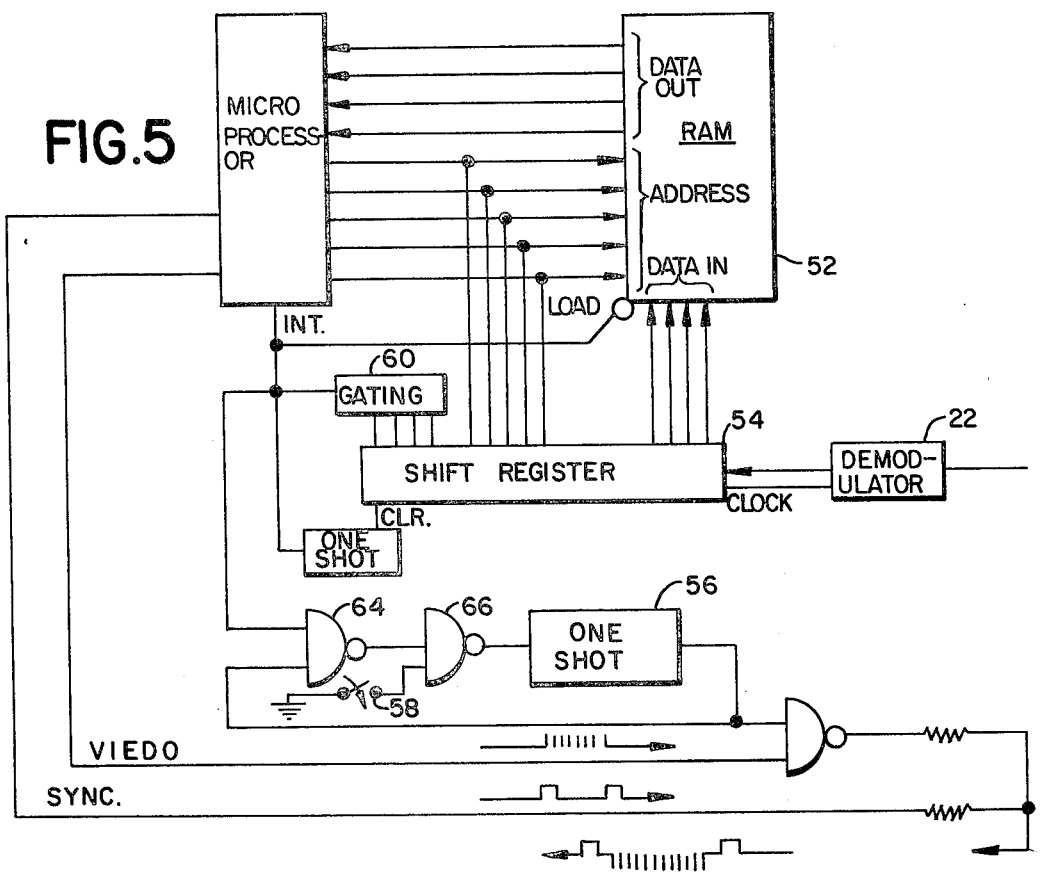
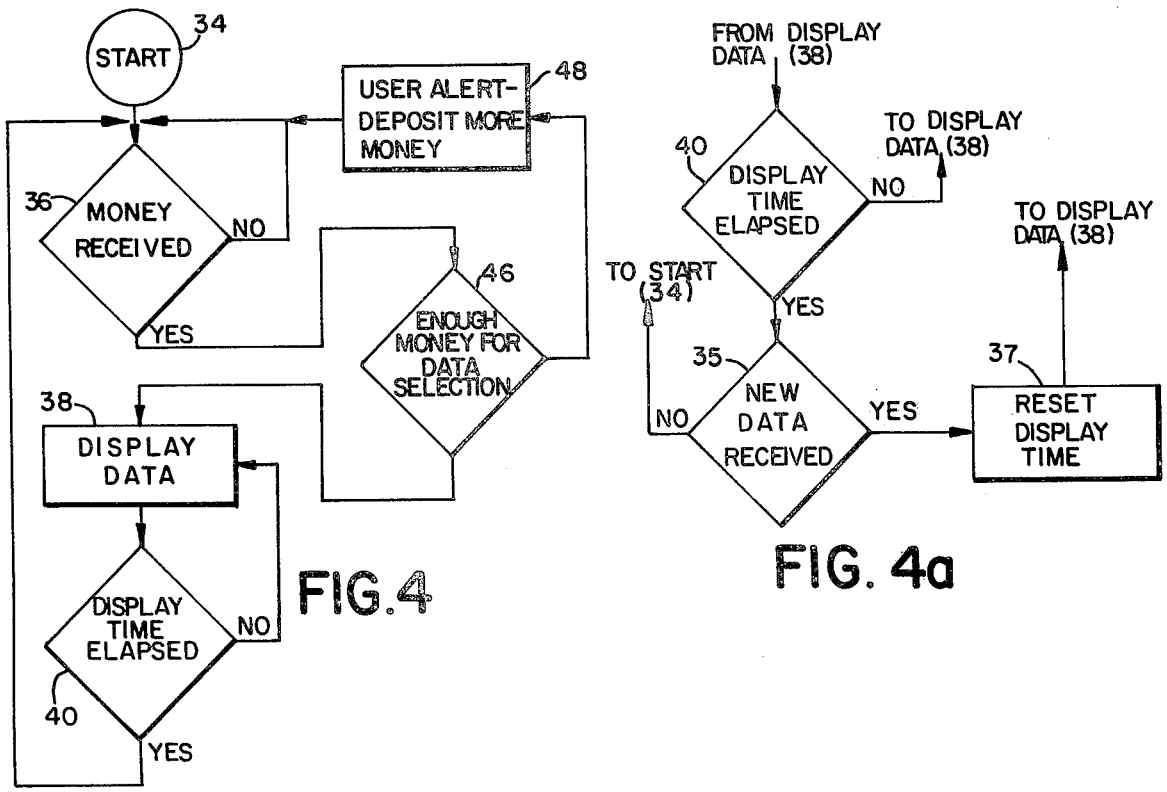

PAYMENT RESPONSIVE DATA DISPLAY NETWORK

BACKGROUND OF THE INVENTION

1. Field of the Invention

This invention relates to the field of information display systems wherein remote terminals present information originally entered at a central processor, and in particular to such systems having coin operated remote terminals.

2. Description of the Prior Art

Data access systems having a plurality of remote terminals in communication with a central processor are well known in the art. These systems are commonly termed "time share systems". In common embodiment, the remote terminal is equipped with a full keyboard and CRT (cathode ray tube) display. In such systems, the remote terminal is programmed for input and output to the central processor, and is nearly equivalent in capability to the operator's monitor terminal at the central processor. In any event, upon operation of the keyboard the user is able to access data in the central processor's memory.

Of course, the capabilities of remote terminals may be limited by programming. Certain commands which may endanger the operation of the system, or possibly allow a breach of security, can be made unacceptable at the remote terminal by appropriate programming of the central processor controlling the remote. Therefore, it is not remarkable that a remote terminal be limited to simple commands which might call up a display of data.

In prior art systems, even limited function remote terminals must communicate with the central processor in order to call up a display of data. This attribute of prior art systems has a number of implications which bear on the reliability and expense of data display systems. Inasmuch as remote terminals must be equipped with sufficient switches to allow the user to select and initiate a data transmission, the remote terminals must be sophisticated in both hardware and software. If phone lines are used for the transmissions to and from the central processor, each remote must be equipped with a modulater/demodulater (modem) to convert digital data signals into tones necessary for phone transmission. If the remote unit is usable for some reason to contact the central processor, no information can be displayed.

At the other side of the system, the central processor must also be sophisticated enough to receive queries from remote units, process the information and transmit a response. In the normal time share system, several transmissions will be required before data can be requested and transmitted to the remote. It is therefore necessary that both the central processor and remote terminal be sophisticated enough to conduct a number of receptions and transmissions in order to service an information request from any single remote. Should the central processor be down, the entire system will be down, and no information will be displayed.

In an information display system where certain parameters are repeatedly displayed, yet the values of such parameters are apt to change over time, prior art systems would require that the central processor service each data query, whether or not the value of the requested parameter has changed during the interval since the last query. In such systems, the central processor becomes a bottleneck. Any problems in the central processor, data transmission network, etc. preclude the possibility of information display.

The present invention contemplates a continuously-available information store at the remote readouts. There is no need for the remote terminal to ever transmit to the central processor unit. Rather, the central processor is adapted to update the remote information store only when necessary due to a change in data value. Accordingly, information is always available at the remote for display. Alternatively, periodic transmissions may be programmed, whereby information is regularly updated without regard to the occurrence or non-occurrence of information queries at the remotes.

In an embodiment adapted for transmission of information periodically, as opposed to transmission upon a change in a data value, the full costs of operation are known from the outset, without reference to the number of data queries at the remotes, or to the rate of change of data values. The system builder can calculate expenses including an unchanging amount of central processor time and an unchanging number of phone calls, and can more readily plan the system. If desired, different terminals can be updated at different frequencies. For example, terminals adapted to display information updated hourly might charge a first price, while terminals updated at five (5) minute intervals or upon every change of data value might charge a significantly higher price then the first. Terminals designed to display stock prices updated frequently would charge more than less-frequently updated weather terminals.

A coin operated time share terminal system is disclosed in U.S. Pat. No. 3,938,093-Riess. Examination of the system disclosed by Riess will indicate that there are substantial savings in system complexity and reliability to be realized from the system of the present invention. Like the present invention, the Riess system is adapted to operate upon receipt of a coin. Unlike the present system, the Riess system conducts two way communication with the central processor, and has only such remote storage capacity as necessary to conduct such two way communications. Both the remote unit and the central processor must be equipped with complete modems, the remote terminal requires a full keyboard, and since the display requests may be unsuccessful, a controller adapted to return coins is required.

The present system requires no keyboard or switches of any kind in its simplest embodiment. Should the system be configured for display of a selection of possible displays, then only a simple switch network will be required, much less than a full keyboard. The central processor need not be accessed at all for a data query. Rather, the information stored in the remote memory is displayed upon query. The control processor, which only transmits the data, is not concerned with individual queries and thus saves time. No data communication reliability problems are encountered during an information query, and therefore information is always available. A coin need never be returned, and a user need never be frustrated.

SUMMARY OF THE INVENTION

It is an object of this invention to apply the benefits of distributed processing networks to the display of information.

It is also an object of this invention to provide a display system which is ultra-reliable, yet not prohibitively expensive.

It is a further object of this invention to provide an information display system that is applicable to a wide range of uses.

It is yet another object of this invention to facilitate dispersal of information to the public.

These and other objects are accomplished by a payment responsive information display system comprising at least one remote terminal for displaying information for a preset time upon payment, for example the deposit of a coin, said remote terminal having sufficient storage for all selectable information; and, a central processor adapted to control input of information and transmission to the remote terminal, said transmission to be initiated at programmed times by the central processor independently of any occurrence of a display query at the remote terminal. A range of preset display intervals can be initiated by input of coins of different denominations, the remote terminal displaying information for a preset time period for each unit of currency represented by said coin. Alternatively, remote displays may be priced as a function of the time between regular periodic updates. Should transmission of data from the central processor to the remote occur during a display interval, the preset time period may optionally be re-started, displaying the updated data. The central processor may initiate a data transmission to the remote information store upon entry of new data, or at regular intervals.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 4 is a flowchart demonstrating the programming of the remote information display;

FIG. 4(a) is a flowchart demonstrating an alternative embodiment for programming the remote display, to be used in conjunction with the flowchart shown in FIG. 4;

FIG. 5 is a schematic diagram of the information processing network in the remote terminal; and, FIG. 6 is a bit map showing the distribution of data bits, address bits and code bits in each transmitted data word.

DETAILED DESCRIPTION OF THE PREFERRED EMBODIMENTS

The respective functions of the central processor and the remote display unit of this invention can be simply described. The central processor must control input of new information, and must transmit such new information to the remote units in order that the same can be displayed when the remote is queried. It is preferred that the transmission be conducted over telephone lines, rather than hard wires, to allow a more widely-dispersed network. Inasmuch as phone lines are not themselves continuous conductors, but rather comprise a series of amplifiers and repeaters, the digital signals representing the data must be placed in a form which can be transmitted over such audio frequency circuitry. Therefore, the digital information is coded into tones, and serially transmitted over telephone lines.

The remote display terminal is adapted to receive the serially transmitted tones, convert the tones into digital data, separate the information from the identification of such information, and store the information in the appropriate memory location. No further communication with the central processor is required, and two way communication is not conducted at all. Should a user desire information and place a coin in the machine, switch closures indicate to the remote unit that a display is requested. The remote terminal reads the requested information from its own internal memory, and displays the same on the display apparatus provided. It is preferred that such display apparatus be a conventional CRT display, however, alpha numeric or numeric displays in combination with permanent labeling can also be used. If a data transmission from the central processor arrives during the displaying time, the remote unit may optionally re-initiate the data query internally, whereby the user is not deprived of the new information.

Figure 1:
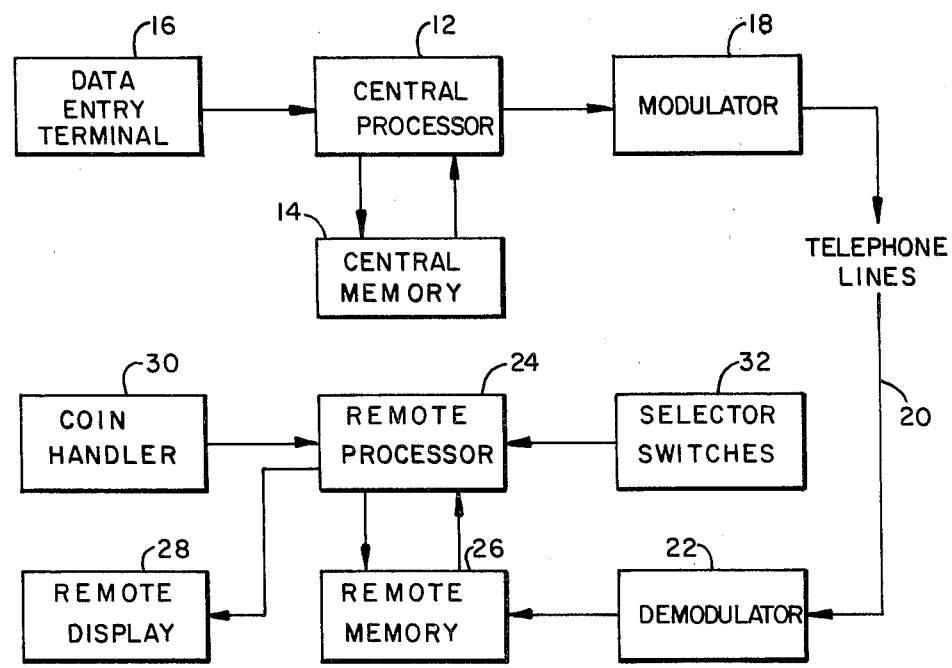
FIG. 1 is a block diagram of the system according to this invention.
Figure 2:
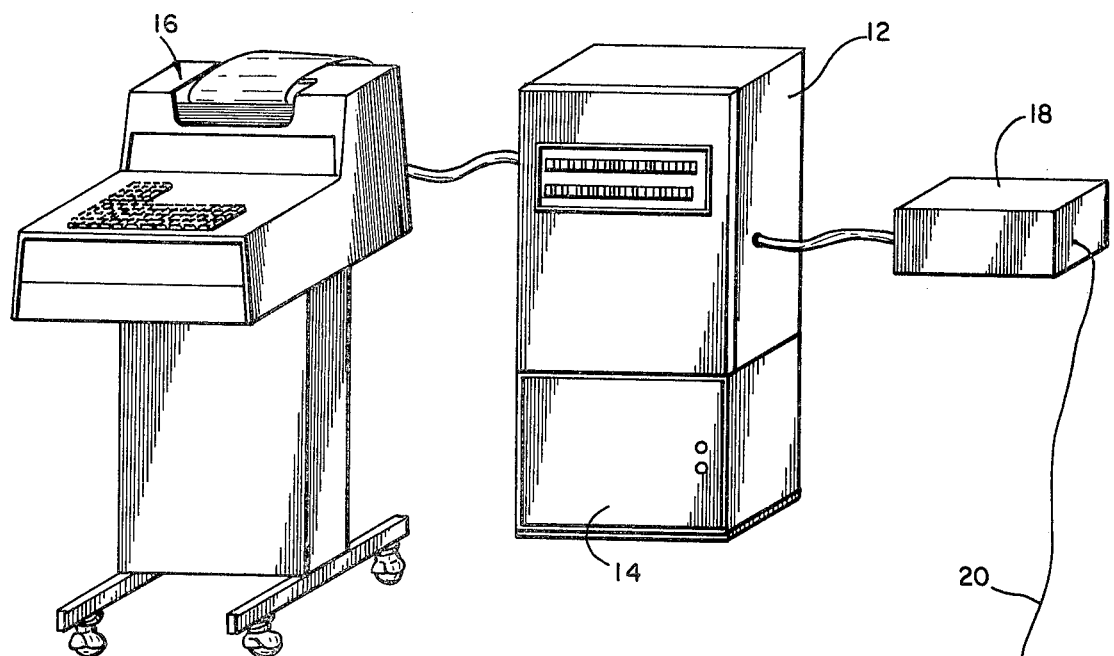
FIG. 2 is a diagrammatic view, in perspective, of the system, the division between the central processor and remote display indicated by dashed lines.

FIG. 1 illustrates a block diagram of the system. FIG. 2 illustrates the connection of the respective components, using like reference numbers. With reference to FIGS. 1 and 2, the specific operation of the system is as follows.

Having become advised of some information to be entered on the system, an operator at the central location queues the central processor 12 to accept data in conventional fashion. Such data may be entered on the teletype terminal 16 shown in FIG. 2, or other data entry devices may be employed. Card readers, magnetic tape, paper tape, or other modes of data entry are possible. Central processor 12 may be programmed to store a complete image of the data stored in remote locations in its own central mass memory 14. This is, however, not necessary. To conserve space in central memory 14, the processor can transmit data received without retaining a duplicate in its own memory. Of course, should periodic updates be contemplated, an internal image of the data should be stored, so that the operator need not re-enter so much of the data as is unchanged over the period.

Transmission is conducted via modulator 18, through phone lines 20 to demodulator 22. In accordance with the system of this invention and in contrast with the prior art, a complete modulator/demodulator is not required at both the central and remote locations. Modulator 18 accepts digital data in the form of voltage levels, as output by central processor 12. The data is modulated accorded to known techniques such as frequency shift keying, or merely by employing a tone to indicate one digital level and the absence of such tone to indicate a second level. The data is transmitted serially, and the only requirement for the output of modulator 18 is that demodulator 22 be adapted to decode the data transmitted. Modulator 18 and demodulator 22 are required because the phone lines 20 are not continuous conductors, but rather may comprise radio transmission links, repeating amplifiers, and other communications apparatus having a bandpass that would degrade purely digital signals.

At the remote terminal, demodulator 22 decodes the tones and again presents digital data indicated by voltage levels to remote memory 26 for storage. Should a display be in progress when transmitted data arrives, the remote unit may optionally detect this occurrence in order that the interval be re-started. In other respects, the display of data and transmission thereof are unrelated.

With respect to display of data, remote processor 24 receives a contact closure or other appropriate signal from coin handler 30 upon receipt of a coin. For purposes of convenience, reference is made throughout to the use of coins and coin-operated remote terminals. It should be appreciated that other forms of currency and legal exchange may be utilized, including paper money, credit cards, charge accounts and so on. Such signal may be a simple closure, or may be a code representing receipt of one of a number of possible coins. Nevertheless, a display query having been initiated, remote processor 24 reads the requested data from memory 26, and displays the same on a CRT or the like (not shown). The CRT is covered by a mask or viewing port 28 to limit access to the display and to reduce brightness requirements and difficulties with reflections. In addition, variable sets of selectable data may be requested by the user using selector switches 32. A push button array, operating a diode switching matrix, for example, may also be employed. The same remote display may be adapted to store information relating to stock prices, sports, news and weather. By positioning selector switch 32 to the desired category, the user can receive a display of only the desired information. It is, of course, a matter of programming whether re-positioning selector switch 32 during a display will permit the user to change from one category to another in mid display without paying additional money.

The central processor, data entry device and modulator are conventional apparatus. The central processor may be only part of a larger data processing system. It is expected that functions in addition to the transmission and entry of data will be up and running on the central computer. For example, remote terminals of a more conventional time share type may be employed. The contemplated central processor would have capacity for a number of concurrent functions. Accordingly, a number of additional peripheral devices would be attached to the system.

The system pictured in FIGS. 1 and 2 has only a single remote unit. It is contemplated that a plurality of remote units would be provided at various locations. Each remote must, of course, be loaded by the central processor. However, the loading of a number of remotes can be handled concurrently, depending on availability of phone lines. There is no requirement that the remote unit "talk back" to the central processor. Therefore, the output of modulator 18 could be run through a number of phone lines to various remotes, which would be loaded simultaneously. Alternatively, the central processor can consecutively phone up and transmit to individual remote units. Automatic dialing apparatus is also contemplated, allowing the central processor to handle the automatic initiation of calls. After going off hook, the central processor handles dialing up the desired remote unit in conventional manner.

Although the central processor contemplated for this invention is one having capacity for additional functions, a microprocessor, or other low capacity computing machine would be also possible. Minimal memory is required in the central processing unit, and, in fact, the storage of all entered data at the central processor is redundant because the same is stored at the remote displays. However, in the event one or more remotes lose storage, for whatever reason, it is easy to refresh the lost memory from the central processor if a complete data store is maintained.

Figure 3:
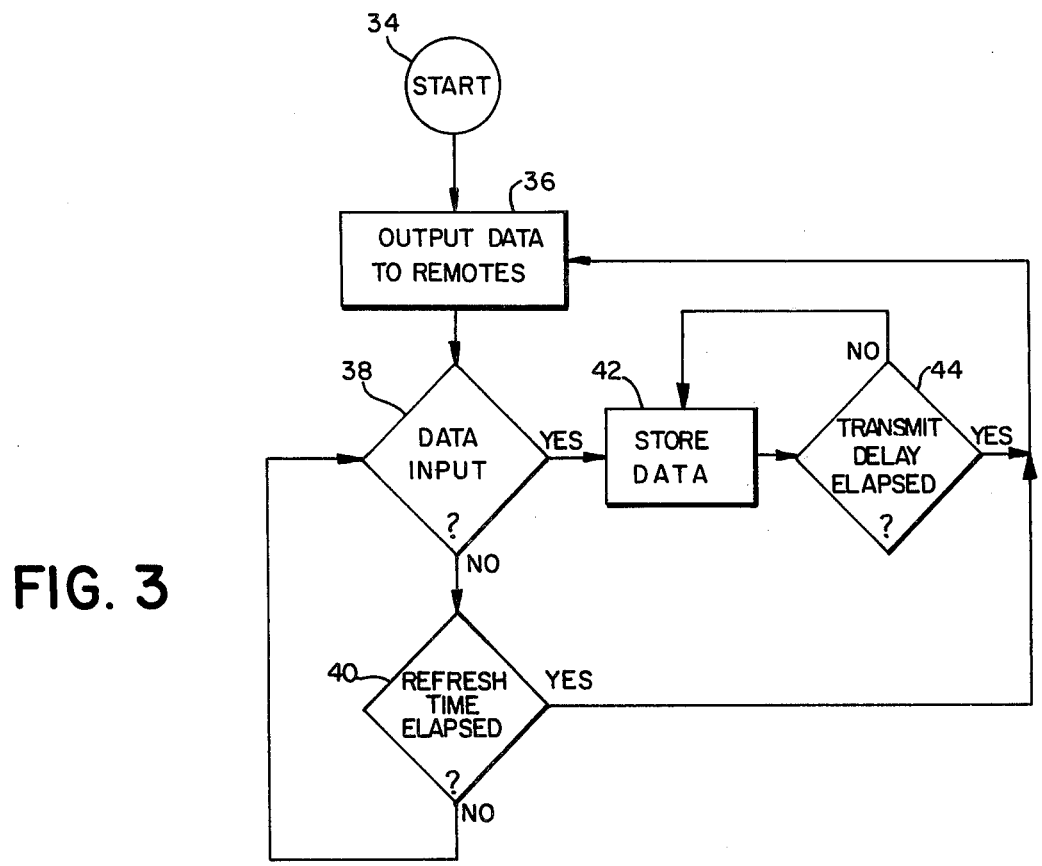
FIG. 3 is a flowchart demonstrating the function of the central processor.

FIG. 3 illustrates the simplified operation of the central processor. Upon initiating the entire system, as shown at entry point 34, a starting set of data is output to the remote terminals at block 36. Having output a starting set of data, the central processor waits in a continuing loop for data to be input (decision block 38) or for a refresh time to elapse (decision block 40). If data is input, the central processor proceeds to block 42, storing the data in its central memory, and then waits for a transmit data delay time to elapse. In order to reduce expenses, it is not presently preferred to transmit data to the remotes each and every time the central data store is updated. Accordingly a delay may be programmed, for example thirty (30) minutes. Accordingly, all updated information received within thirty (30) minutes of the initial input update will be transmitted to the remotes at the same time. The next data input would start the thirty (30) minute delay again. This permits costs to be fixed, and facilitates charging on the basis of how often the remotes are updated. After the transmit delay time elapses, the new data is output to the remote devices at block 36. As discussed above, it is not strictly necessary that the central processor have capability of storing all data. Rather, the central processor could immediately output new data, for example, information on only a single changed parameter. If no new data has been entered, it is preferred that the central processor nevertheless output data at periodic intervals, to deal with the possibility that power has been lost at a certain remote display, or that for some reason a remote has lost its stored information. A refresh time is provided for that purpose (decision block 40), by which the remotes may be refreshed, periodically, for example, every six (6) hours. The time delay chosen will depend on cost factors and may be shorter during periods of frequent use and longer during periods of infrequent use.

FIG. 4 illustrates the function of the remote display unit. Starting at point 34, the remote processor remains idle until money, most likely in the form of a coin is received (decision block 36). During this time, the display is blank. When a coin is received, the remote processor decides if enough money has been paid for the selected information (decision block 46). If enough money has been received, the selected information is displayed, as shown at block 38. The device again remains idle while displaying the requested selection until the preset display time has elapsed (decision block 40). In an alternative embodiment shown in FIG. 4(a), if the time has partially elapsed, display will continue if new data has been received (decision block 35) during the display. If new data has been received, the preset timer is reset as if a coin was just inserted (block 37) and the display continues (block 38) with the newly received data. If no new data has been received, the display ends and the remote again waits in an idle condition for a subsequent coin (decision block 36).

The preferred embodiment for the control and display of information at the remote processor includes random access memory (RAM) for data storage, a microprocessor for control and a CRT for data display. As is known in the art, the microprocessor can be programmed to generate the necessary sync and video signals to operate a video display. Briefly, this function is handled by running the microprocessor in a programmed loop to time the appropriate signals, and to place dots in the video signal at appropriate places for generation of character displays dependent upon the information read from the random access memory. A sync pulse is required for the beginning of a video frame, and at each horizontal line. In counting the appropriate timing and lines, the microprocessor generates a video display into which dots are inserted. Converting the digital data read from memory into dots is normally controlled by read only memory (not shown). The microprocessor normally outputs digital data representing the information to be displayed to the read only memory, and reads information from said read only memory indicating the dots required to form characters on the screen. The required dots are inserted as pulses into a video signal, and unblank the CRT display at required times to generate dots that appear in combination as characters.

As is apparent from FIG. 5, the loading of data received from the central processor through demodulator 22 is not a direct function of the remote microprocessor. Rather, the microprocessor operation is suspended during loading, but the microprocessor is not directly involved with the loading function. Incoming data from demodulator 22 is shifted along serial shift register 54. Each data word contains an address section of a predetermined number of bits, and a data section of a predetermined number of bits. Code bits precede each word, whereby gating 60 at the end of the shift register detects the presence of an "end of word" code when a full word is loaded. A full word having been loaded, the microprocessor is interrupted and timer 56 reset via NAND gate 64. The interrupt service subroutine outputs an all bits high condition to the RAM address lines for a short interval. The address bits from the shift register are wire OR'ed with outputs from the microprocessor (now all high). Inasmuch as the microprocessor operation has been suspended by interrupt, the shift register outputs, which are preferably open collector outputs, are effective to pull the desired lines low, and address a certain memory location in the random access memory. The data section of the data word is simultaneously presented to the random access memory data input lines from the output lines of shift register 54. Upon detection of an end of word by gating 60, a load signal is passed to the random access memory, thereby loading the value of the selected parameter into the appointed memory address. In this manner, the random access memory is loaded with information to be displayed.

It is preferred that the microprocessor continuously generate a sync and video signal, notwithstanding the presence or absence of a display request. The video signal, however, is only passed through gate 62 when resettable timer 56 is timing. Therefore, although the microprocessor is continuously generating a video signal, the signal contains information only when desired. The sync signal is not gated on and off. By this method, the CRT display does not flicker or roll when video is suddenly added to or removed from the composite signal. If the timer has timed out, gate 62 blocks the video signal. Resettable timer 56 is actuated by the receipt of a coin, as detected by switch 58. Should resettable timer be timing, and a new data word be received, resettable timer 56 end of transmission signal detected by gating 60, then gated through gates 64 and 66. One input to gate 64 is the output of resettable timer 56. Accordingly, unless the timer is operative when an end of transmission code or end of word code is detected by gating 60, resettable timer will not be reset.

Figure 6:
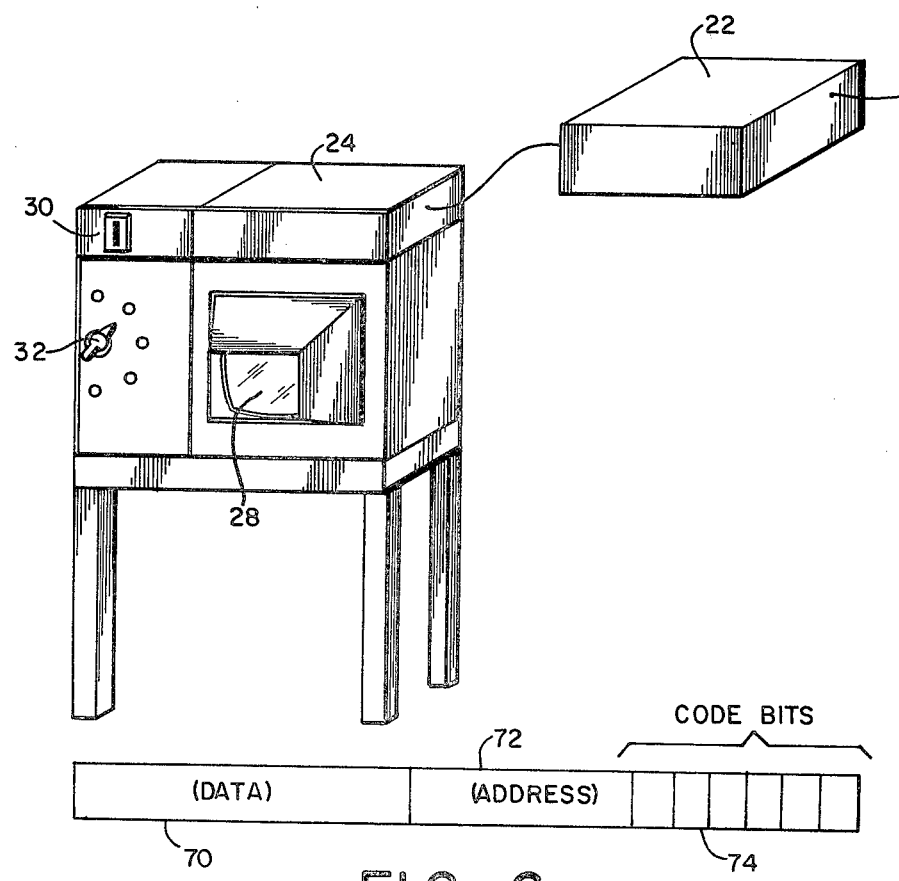

FIG. 6 illustrates the content of each data word. It will be appreciated that a number such as a stock price, a temperature, or the like is useless unless some identification is provided indicating exactly what the number represents. In the present invention, a memory location in the random access memory is devoted to each possible parameter to be displayed. The information regarding that parameter is represented by the information stored in that memory location. Therefore, both the address and data for each parameter must be transmitted to the remote display unit by the central processor, in order that intelligible information be conveyed.

The transmission being conducted in serial rather than parallel, some indication must also be provided as to the end of the word of data and address. Code bits 74 are provided as shown in FIG. 6 to indicate receipt of a full word of data/address. The code bits can also indicate further functions, as needed. For example, if more than a single data/address word is to be transmitted in a single transmission from the central processor, two different codes can be employed. Six bits are shown in FIG. 6 in the section 74 indicating code bits. This number of code bits would allow 64 different possible codes for whatever 64 functions might be desired, i.e., 2 to the 6th power. Each code used must be detectable by gating 60. In a simple embodiment, a code indicating an end of word, and a second code indicating an end of transmission are preferred.

The circuitry of the remote processor, memory and associated electronics consists of standard, off the shelf, electronic packages. There is no criticality to the timing or components. Microprocessor 50 may be run from a crystal clock or an LC oscillator, with the only limitation being that the range of variation in the sync signal must be acceptable to the CRT display's oscillators.

The disclosed system is dependable in that the display operates independently of the central processing unit. The central processing unit's time is also saved by this method, and very little memory is required to service the system. In addition, phone lines are only used for transmission of new data, rather than back and forth communications during each query for information.

It must be appreciated that the present invention is not limited to the precise arrangements and instrumentalities shown and discussed. Variations on the inventive concept will now be apparent to those of ordinary skill in the art. Accordingly, reference should be made to the appended claims rather than the foregoing Specification as indicating the true scope of this invention.

I claim:

1. A payment responsive system for displaying information, comprising:
   at least one remote terminal for displaying information for a preset time upon payment, said remote terminal having sufficient storage for all selectable information; and,
   a central processor adapted to control input of information and transmission to the remote terminal, said transmission to be initiated at programmed times by the central processor independently of any occurrence of a display query at the remote terminal.

2. The system of claim 1, wherein the remote terminal further comprises means for initiating the display of information in response to an information query denoted by said payment.

3. The system of claim 2, wherein said preset time period is restarted upon occurrence of transmission from the central processor during a display interval.

4. The system of claim 3, wherein said programmed times include a transmit time delay initiated by data input to the central processor and a refresh time independent of data input to the central processor.

5. The system of claim 1, further comprising a modulator at the central processor and a demodulator at the remote terminal, said transmission being conducted over at least one telephone line to said at least one remote terminal.

6. The system of claim 1, wherein a plurality of remote terminals are provided, each remote terminal having a demodulator accessible by telephone lines from a single central modulator, whereby the remote terminals may be accessed simultaneously.

7. The system of claims 5 or 6, further comprising means on the remote terminal for selecting a display of a total store of information.

8. The system of claims 5 or 6, wherein said transmission from the central processor to the remote terminal includes a total store of information.

9. The system of claims 5 or 6, wherein the transmission from the central processor to the remote terminal consists of recently updated information.

* * * * *

UNITED STATES PATENT AND TRADEMARK OFFICE
CERTIFICATE OF CORRECTION

PATENT NO. : 4,370,649

DATED : January 25, 1983

INVENTOR(S) : Gerard A. Fuerle

It is certified that error appears in the above-identified patent and that said Letters Patent is hereby corrected as shown below:

Column 4, line 53, "accorded" should read -- according --.

In Figure 5, "viedo" should read -- Video --.

In Figure 5, MICROPROCESSOR block should be labelled -- 50 --.

In Figure 5, the unlabelled NAND gate which is connected to resettable timer 56 should be labelled -- 62 --.

Signed and Sealed this

Twelfth Day of March 1985

[SEAL]

Attest:

DONALD J. QUIGG

Attesting Officer  Acting Commissioner of Patents and Trademarks